Oct. 4, 1938.   J. D. NIXON ET AL   2,132,182
STUFFING BOX
Filed Nov. 5, 1936

Inventors
Jeddy D. Nixon
Clifton H. Lee
By Jack Ashley
Attorney

Patented Oct. 4, 1938

2,132,182

UNITED STATES PATENT OFFICE 2,132,182

STUFFING BOX

Jeddy D. Nixon and Clifton H. Lee, Houston, Tex.

Application November 5, 1936, Serial No. 109,257

2 Claims. (Cl. 286—34)

This invention relates to new and useful improvements in stuffing boxes.

One object of the invention is to provide an improved stuffing box arranged to automatically lubricate the packing therein and the rod or other reciprocating element extending therethrough.

Another object of the invention is to provide a stuffing box so constructed that excessive wear on the packing and the reciprocating element extending through the packing will be reduced to a minimum and the life of both prolonged.

Still another object of the invention is to provide means in a stuffing box for providing and maintaining a fluid level in said box, whereby fluid will be held in the box above the lower packing to lubricate the reciprocating element, and more efficient lubrication will be had under all conditions.

An important object of the invention is to provide a stuffing box so arranged as to employ the fluid being worked, as a lubricant, together with means co-acting with the reciprocating element for replenishing the supply of lubricant provided in the box.

In the oil fields there is a type of well known as "head" wells, which makes or produces fluid only at intervals. When a well is being pumped, the pumping mechanism is usually running continuously and the fluid is only produced sufficiently for the pumping mechanism to pick up said fluid at intervals, and these intervals may be from fifteen minutes to four hours in length. With the stuffing boxes now on the market, the pumping rod is reciprocating continuously through the stuffing box, and when the well is not producing fluid to be lifted, the rod extending through the packing of the box will become dry and excessively wear the packing and burn the same. Also, the rod becomes heated and scores, so that not only does the packing have to be replaced rather frequently, but the rod must be replaced much sooner than should be necessary.

Another object of the invention is to provide a stuffing box so constructed that a reservoir is provided therein, so that said stuffing box is readily adaptable for use on wells known as "head" wells, and the reciprocating element extending through said stuffing box is lubricated during the intervals occurring between each load or "head" of fluid, whereby the packing will not be burned and the rod will not become scorched or scored.

A construction designed to carry out the invention will be hereinafter described, together with other features of the invention.

The invention will be more readily understood from a reading of the following specification and by reference to the accompanying drawing, in which an example of the invention is shown, and wherein.

Figure 1:
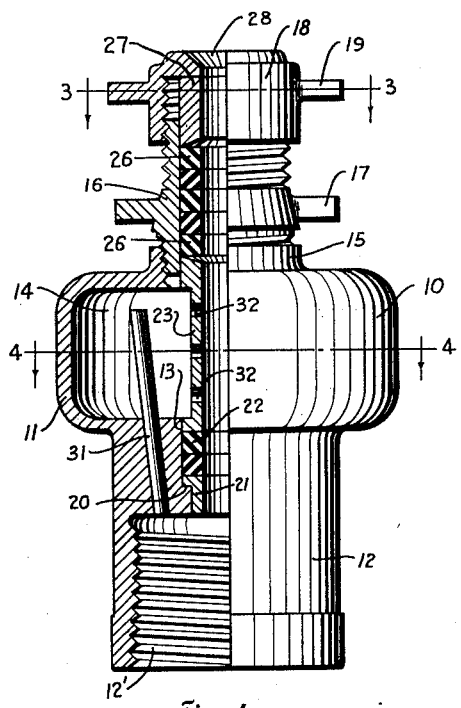
Figure 1 is a view of a device constructed in accordance with the invention, partly in section and partly in elevation.
Figure 3:
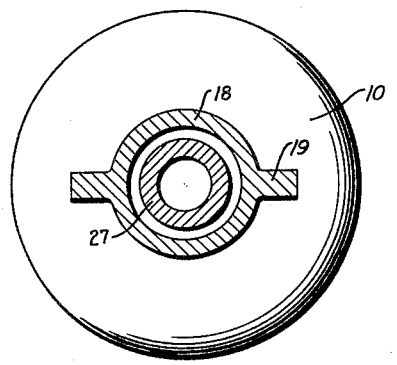
Figure 3 is a horizontal cross sectional view taken on the line 3—3 of Figure 1.
Figure 4:
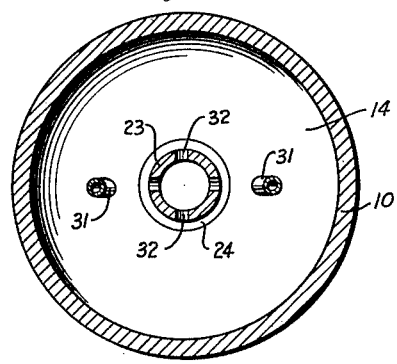
Figure 4 is a similar view taken on the line 4—4 of Figure 1.

In the drawing the numeral 10 designates the body of a stuffing box having a bowl 11 and a reduced shank 12 depending therefrom, the lower end of which is provided with an internally screw-threaded box 12' for receiving the externally screw-threaded pin of the usual well tubing or casing. The bowl provides a chamber or a reservoir 14 for the storage of a fluid or a lubricant and an axial opening 13 extends from the bowl to the box 12'.

The upper end of the bowl 10 is provided with an internally screw-threaded collar 15, which receives an externally screw-threaded sleeve 16. The sleeve has diametrically extending thumb lugs or projections 17, for gripping the sleeve and screwing it into and out of the collar 15. The upper end of the sleeve receives a cap nut 18, which is provided with thumb lugs 19, similar to the lugs 17.

The axial opening 13 is provided near its lower end with an annular shoulder 20 for receiving a flanged guide collar 21, which supports thereabove, a pair of elastic packing rings 22 of rubber or other suitable material. An elongated, perforated bushing 23 is mounted on the packing rings and at its lower end an annular flange 24 made integral therewith, for snugly engaging in the opening 13. The upper end of the bushing is provided with a flange 25, somewhat similar to the flange 24, and which snugly engages within the axial bore of the sleeve 16. The upper end of the bushing is dished, as shown in Figures 1, 2 and 5.

Figure 2:
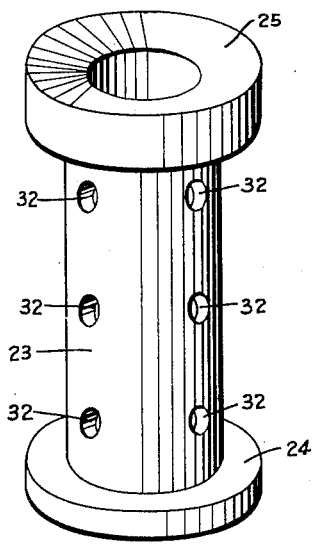
Figure 2 is an isometrical view of the guide bushing of the stuffing box.
Figure 5:
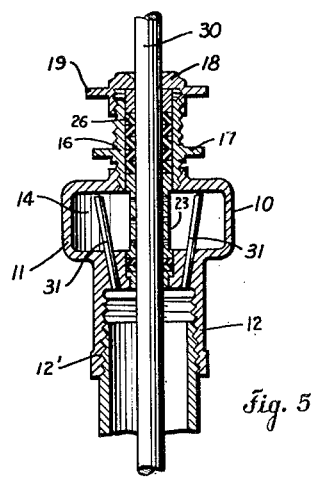
Figure 5 is a vertical sectional view of the stuffing box, illustrating a portion of a rod or other element extending therethrough.

A plurality of packing rings 26 snugly fit within the bore of the sleeve 16, and are supported on the outer, upper rim or edge of the boss 25, as will be seen in Figures 1 and 5. Mounted above the packing rings 26 is a suitable gland 27, which snugly engages within the bore of the nipple 16. The gland may be made integral with the cap or a separate unit, as desired. The lower end of the gland is preferably beveled to correspond with the dished surface of the sleeve 23 and, as will be seen in Figures 1 and 5, only the outer rim or edge of the block engages the packing ring 27; thus, it will be seen that upon downward movement of the gland the packing is forced inwardly, as well as downwardly.

The cap nut 18 has an inwardly extending, annular lip 28 for engaging the upper end of the gland to impart downward movement or pressure thereto. Attention is called to Figures 1 and 5, wherein it will be seen that with the rotating of the nut 18, so as to screw the same downwardly on the sleeve 16, the gland 27 will be forced downwardly thereby, and the packing rings 26 will be distorted. A certain amount of this downward pressure will be transmitted through the bushing 23 to the packing rings 22, which will also be deformed, because the guide collar 21 resting on the shoulder 20 of the opening 13 prevents further downward movement. It is pointed out that an axial passage through the stuffing box is formed and the rod, cable, wire line, or other reciprocating element 30 passing through the stuffing box will be gripped by the packing rings 26 at the upper end of the stuffing box, and by the packing rings 22 at the lower end of the stuffing box. It is pointed out that the size of the passage through the stuffing box may be varied to accommodate any size of element it is desired to pass through the stuffing box.

Stuffing boxes are ordinarily used where a well is being pumped or fluid is being handled, and, as the lower end of the stuffing box is connected to the well casing or tubing, fluid will at various times come up within the lower end of the box 11 of the stuffing box. A pair of tubes 31 or other suitable conductors extend from the top of the box 12' upwardly through the chamber 14 to within a short distance of the top thereof, to provide communication between the box 12' on the lower end of the stuffing box and the chamber, so that when fluid flows up into the box it will be conducted to the chamber 14, and fill the same to the level of the top of the tubes 31. As will be seen in Figures 1, 2, 4 and 5, the bushing 23 is provided with holes or perforations 32, whereby the fluid will be permitted to enter the bushing and surround the rod or other element 30 extending therethrough. Inasmuch as the packing rings 22 are engaging the rod 30, the fluid will not leak therebetween, and it will be seen that the rod passing either upwardly or downwardly will be coated with a film of the fluid within the chamber and thus, lubricated through the packing rings 26 if passing upwardly, or the packing rings 22 if passing downwardly.

In the type of wells known as "head" wells, fluid is only produced at intervals, and for different wells these intervals may be from five, ten or fifteen minutes up to three or four hours in length. It can be readily seen that with a rod or other element reciprocating through packing which has sufficient contact with said element to prevent fluid or gas escaping therebetween, that said element would soon be scraped free of fluid and become dry, which would then burn the packing and in turn said element. With applicants' invention the chamber 14 holds a reservoir or storage of the fluid being worked, which is usually crude oil, but may be any other fluid present in said well. The rod is lubricated while reciprocating during said intervals and the packing does not burn or necessitate frequent replacement. It is pointed out that while the tubes 31 are shown as filling the chamber 14, said chamber may be readily filled externally, or in any other manner desired.

This invention is also particularly useful where the rod 30 remains stationary for quite some time before being lowered into the stuffing box and the tubing or casing, because the chamber 14 will hold the fluid as long as the packing rings 22 engage the rod 30 sufficiently to prevent leakage therearound. If desired, a fluid may be poured around the rod above the packing 26 and in the opening through the lip 28 of the cap 18, in order to lubricate the upper packing rings 26, although this is not always necessary, unless it is desired on the first trip into the well. It is pointed out that the rod on its upward travel was coated with a thin film of fluid which the packing rings 26 did not remove. This film will protect the rod and packing and will lubricate said rod through said packing rings 26.

What we claim and desire to secure by Letters Patent is:

1. A stuffing box including, a body having a lubricant storage chamber, a perforated sleeve extending through the chamber, a sealing member having a tapered screw threaded portion screwed into the top of the body and forming a fluid tight seal therewith, said member surrounding the upper end of the sleeve, packing below said sleeve for sealing member above said sleeve for sealing the upper end of said chamber and for stripping fluid from the reciprocating element, and an overflow conductor extending into the chamber terminating above the bottom of said chamber for maintaining a fluid level therein within said chamber and below the sealed joint.

2. A stuffing box including, a body having a broad flat lubricant chamber and having a tapered screw threaded opening in its top wall and an opening in its bottom wall, a perforated sleeve extending axially through the chamber with its ends protruding into the top and bottom openings thereof, a gland member telescoping the upper end of the sleeve and having its lower end tapered and externally screw threaded for engaging in the tapered opening of the chamber to form a fluid-tight seal therewith, packing within the member engaging the upper end of the sleeve for receiving and stripping fluid from an element reciprocating in said sleeve, packing in the bottom opening of the chamber supporting said sleeve, and an overflow pipe extending through the bottom wall of the chamber terminating above the bottom of said chamber for conducting oil under pressure from below said chamber into said chamber.

JEDDY D. NIXON.
CLIFTON H. LEE.